Figure 1:
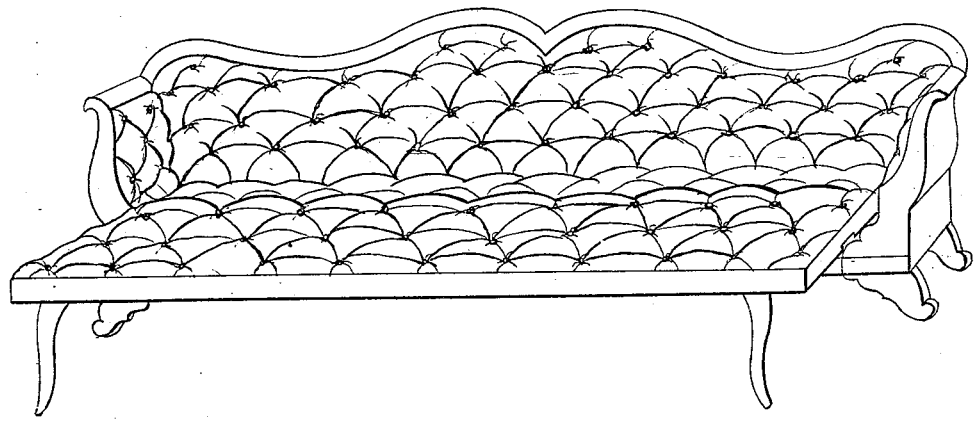
Figure 2:
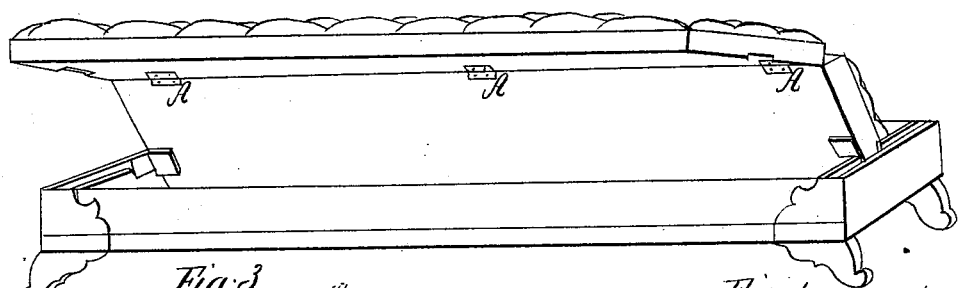
Figure 3:
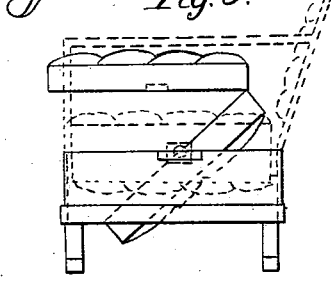
Figure 4:
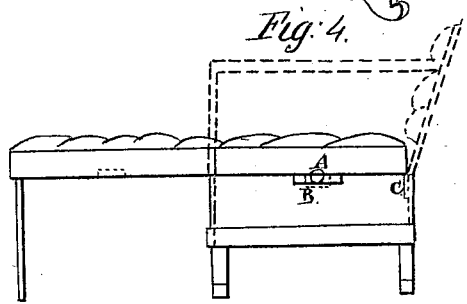

E. B. Bowditch,
Sofa Bedstead,
Nº 6,607.   Patented July 24, 1849.

UNITED STATES PATENT OFFICE.

E. B. BOWDITCH, OF NEW HAVEN, CONNECTICUT.

SOFA-BEDSTEAD.

Specification of Letters Patent No. 6,607, dated July 24, 1849.

*To all whom it may concern:*

Be it known that I, EDWIN B. BOWDITCH, of the town and county of New Haven and State of Connecticut, have invented a new and Improved Sofa-Bed; and I do hereby declare that the following is a full and exact description.

My invention consists in introducing under the common seat of a sofa (or other suitable article of furniture) another seat called the under seat, or bed, which revolves on pivots at each end, and said under seat is so hinged to the top seat, as when the said top seat is drawn or tilted to the front, the said under seat will revolve, thereby bringing the stuffed side up, and on a level with said top seat which forms a good sized bed.

To enable others skilled in the art, to make and use my invention, I proceed to describe its construction and operation.

I construct a sofa in the usual manner, leaving a space under the top seat, for another seat to revolve in. This revolving seat when the sofa is closed is in such a position that the stuffed side is the under or lower side (shown in the accompanying drawing by Fig. No. 3).

The pivots on which it revolves, are fastened to the under seat, the revolving center of which, is, the middle of the line formed by the bottom of the seat at the ends (shown by Fig. No. 4 A). These pivots revolve in a slot about one inch deep, by three or four inches long (shown by Fig. No. 4–B). This slot allows the seat when spread out to be pushed back, that it may rest on a cleat on the inside of the back of the sofa frame, (shown in Fig. No. 4–C) in such a position as to be kept from revolving when in use as a bed. The two seats are hinged with suitable hinges, at the back corners where they come together, (shown by Fig. No. 2 AAA.)

The sofa is formed into a bed, by lifting the top seat, by a loop fastened at the back, and lifting the front of the seat at the same time, (which projects enough for the purpose) until in a convenient position, to let down the feet which shut into recesses in the bottom of the seat, and which support it when drawn out, the seat is then let down bringing both seats on a level, they are then pushed one inch back that the back seat may rest on the cleat as described.

This invention is adapted to sofas, lounges, &c having spiral spring seats.

What I claim as my invention, and desire to secure by Letters Patent, is—

The construction of a seat, or bed, placed under the ordinary seat, of a sofa, couch, lounge, or any other suitable piece of furniture, which will revolve on suitable pins or pivots A of wood, or metal, at each end, working in slots B as described, said seat, or bed, to be hinged to the ordinary seat, in such a manner, that when the ordinary seat is drawn or tilted forward, the under seat or bed will revolve, and come on a level with the ordinary seat, which combined, will form a level and good sized bed.

The above specification signed and witnessed, this third day of March, A. D. 1849.

EDWIN B. BOWDITCH.

Witnesses:
C. C. CLINTON,
WM. H. AUGUR.